US007813117B2

(12) United States Patent  
Olesiewicz et al.

(10) Patent No.: US 7,813,117 B2
(45) Date of Patent: Oct. 12, 2010

(54) HARD DISK DRIVE THROUGHPUT-ENHANCING VIBRATION CONTROL DEVICE

(75) Inventors: Timothy W. Olesiewicz, Santa Clara, CA (US); Kenneth D. Shaul, Santa Clara, CA (US); Brett C. Ong, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 229 days.

(21) Appl. No.: 12/187,140

(22) Filed: Aug. 6, 2008

(65) Prior Publication Data

US 2010/0033909 A1 Feb. 11, 2010

(51) Int. Cl.
*H05K 7/00* (2006.01)
*A47B 81/00* (2006.01)
*G11B 7/00* (2006.01)

(52) U.S. Cl. .............................. 361/679.34; 361/679.33; 361/679.35; 361/679.38; 312/223.1; 720/692; 248/638; 206/521

(58) Field of Classification Search . 361/679.31–679.4, 361/679.55, 679.58, 724–727, 683, 684, 361/685, 686; 312/331, 223.1, 223.2; 211/26; 439/157, 60, 152–153, 327, 328, 331
See application file for complete search history.

(56) References Cited

U.S. PATENT DOCUMENTS

| 4,796,849 A | * | 1/1989 | Fouassier .................. 248/619 |
| 2007/0030639 A1 | * | 2/2007 | Ko .............................. 361/685 |
| 2008/0291618 A1 | * | 11/2008 | Sheng ......................... 361/685 |
| 2009/0031334 A1 | * | 1/2009 | Goodman et al. ........... 720/692 |
| 2009/0095873 A1 | * | 4/2009 | Peng et al. .................. 248/560 |

* cited by examiner

Primary Examiner—Zachary M Pape
Assistant Examiner—Jerry Wu
(74) Attorney, Agent, or Firm—Osha • Liang LLP

(57) ABSTRACT

In a hard disk drive (HDD) vibration control device disposed on a HDD bracket including a HDD, the HDD vibration control device includes a main body portion, a rear clip, a front clip, a left rail spring, and a right rail spring. The main body portion includes a front bar, a rear bar, left bar, and right bar. The rear clip extends down from the rear bar clamped onto the HDD. The front clip extends down from the front bar clamped onto the HDD. The left rail spring includes a first flat portion extending outwards from the left bar and including a first spring portion extending from the first flat portion. The right rail spring includes a second flat portion extending outwards from the right bar and including a second spring portion extending from the second flat portion. The first and second flat portions of the left rail spring the right rail spring rest, respectively, on top surfaces of a left side bracket and right side bracket of the HDD bracket. The first and second spring portions of the left rail spring and the right rail spring arc above the top surfaces of the left side bracket and the right side bracket, and are configured to flex downwards when a force is applied from above.

19 Claims, 6 Drawing Sheets

HARD DISK DRIVE THROUGHPUT-ENHANCING VIBRATION CONTROL DEVICE

BACKGROUND OF INVENTION

FIG. 1 shows a typical computer server rack 10 with blade servers 20 disposed therein. As can be seen in FIG. 1, computer servers 20 are generally very thin, and very little tolerance exists between the individual blade servers 20 within the computer server rack 10, as well as between the blade servers 20 and the server rack 10. Further, because of the thinness of each blade server 20, little tolerance exists for components within the blade server 20.

Over time, as the performance of rack mounted computer systems has increased, the amount of heat generated by various computer system components has increased. This, in turn, requires enhanced cooling to maintain required operating temperatures. The most common approach to computer system cooling is the use of fans. However, with the ever-increasing power budget and space constraints of rack mounted computer systems, available cooling solutions are limited. Because space constraints restrict the physical size of fans, a common solution is the use of fans with high revolutions per minute ("RPM"). However, high RPM fans significantly increase the amount of vibration generated throughout the computer system.

Because of these height constraints and, consequently, the fact that there is little or no clearance between the fan and the server enclosure, vibration generated by the fan is transferred through the support structure to other components within the computer system. The generated vibration transferred throughout the computer system can negatively impact the performance of the other components. For example, hard disk drives ("HDDs") also present in the computer system may be highly sensitive to vibrations and, thus, the performance thereof can be degraded by the transferred vibration from the fan. The problem has been compounded by the increasing density of HDDs, because the HDDs' sensitivity to vibration is also increased.

One way to alleviate the vibration issue would be to mechanically dampen the HDDs. However, due to differences in the HDD technology and manufacturing, depending on HDD design and/or manufacturer, HDDs may have varied vibration resilience properties and varied requirements for vibration-proof mounting. For example, some HDDs can be extremely sensitive to linear vibration in a high frequency range, while some HDDs can be sensitive to rotational vibrations in a low frequency range and require completely different mounting and vibration mitigation features.

A single design of a HDD bracket cannot effectively accommodate unique vibration control requirements of all available drives. This limits the choice of the qualified drives for a bracket design and, hence, limits the list of approved HDD vendors and HDD types. To meet the requirements of each HDD type by designing mechanical dampening into HDD brackets, a prohibitive number of HDD bracket designs may be required, or the number of HDDs offered may have to be reduced significantly.

SUMMARY OF INVENTION

One or more embodiments of the present invention relate to a hard disk drive (HDD) vibration control device disposed on a HDD bracket comprising a HDD, the HDD vibration control device comprising: a main body portion comprising a front bar, a rear bar, left bar, and right bar; a rear clip extending down from the rear bar clamped onto the HDD; a front clip extending down from the front bar clamped onto the HDD; a left rail spring comprising a first flat portion extending outwards from the left bar and comprising a first spring portion extending from the first flat portion; and a right rail spring comprising a second flat portion extending outwards from the right bar and comprising a second spring portion extending from the second flat portion, wherein the first and second flat portions of the left rail spring the right rail spring rest, respectively, on top surfaces of a left side bracket and right side bracket of the HDD bracket; and wherein the first and second spring portions of the left rail spring and the right rail spring arc above the top surfaces of the left side bracket and the right side bracket, and are configured to flex downwards when a force is applied from above.

One or more embodiments of the present invention relate to a blade server comprising a drive cage, a hard disk drive (HDD) bracket comprising a HDD disposed in the drive cage, and a HDD vibration control device disposed on the HDD, the HDD vibration control device comprising: a main body portion comprising a front bar, a rear bar, left bar, and right bar; a rear clip extending down from the rear bar clamped onto the HDD; a front clip extending down from the front bar clamped onto the HDD; a left rail spring comprising a first flat portion extending outwards from the left bar and comprising a first spring portion extending from the first flat portion; and a right rail spring comprising a second flat portion extending outwards from the right bar and comprising a second spring portion extending from the second flat portion, wherein the first and second flat portions of the left rail spring the right rail spring rest, respectively, on top surfaces of a left side bracket and right side bracket of the HDD bracket; wherein tops of the first and second spring portions and abut a top wall of the drive cage; and wherein the first and second spring portions of the left rail spring and the right rail spring arc above the top surfaces of the left side bracket and the right side bracket, and are configured to flex downwards when the top wall of the drive cage exerts a downward force thereon.

One or more embodiments of the present invention relate to a hard disk drive (HDD) vibration control device configured to be disposed on a HDD bracket comprising a HDD, the HDD vibration control device comprising: a main body portion comprising a front bar, a rear bar, left bar, and right bar; a rear clip extending down from the rear bar and configured to clamp onto the HDD; a front clip extending down from the front bar and configured to clamp onto the HDD; a left rail spring extending outwards from the left bar and comprising a flat portion and a first spring portion; and a right rail spring extending outwards from the right bar and comprising a flat portion and a second spring portion, wherein the first and second flat portions of the left rail spring the right rail spring are configured to rest on top surfaces of left and right side brackets of the HDD bracket; and wherein the first and second spring portions of the left rail spring the right rail spring are configured to rest on top surfaces of the left and right side brackets and to flex downwards when a force is applied from above.

Other aspects and advantages of the invention will be apparent from the following description and the appended claims.

DETAILED DESCRIPTION

Exemplary embodiments of the invention will be described with reference to the accompanying figures. Like items in the figures are shown with the same reference numbers.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
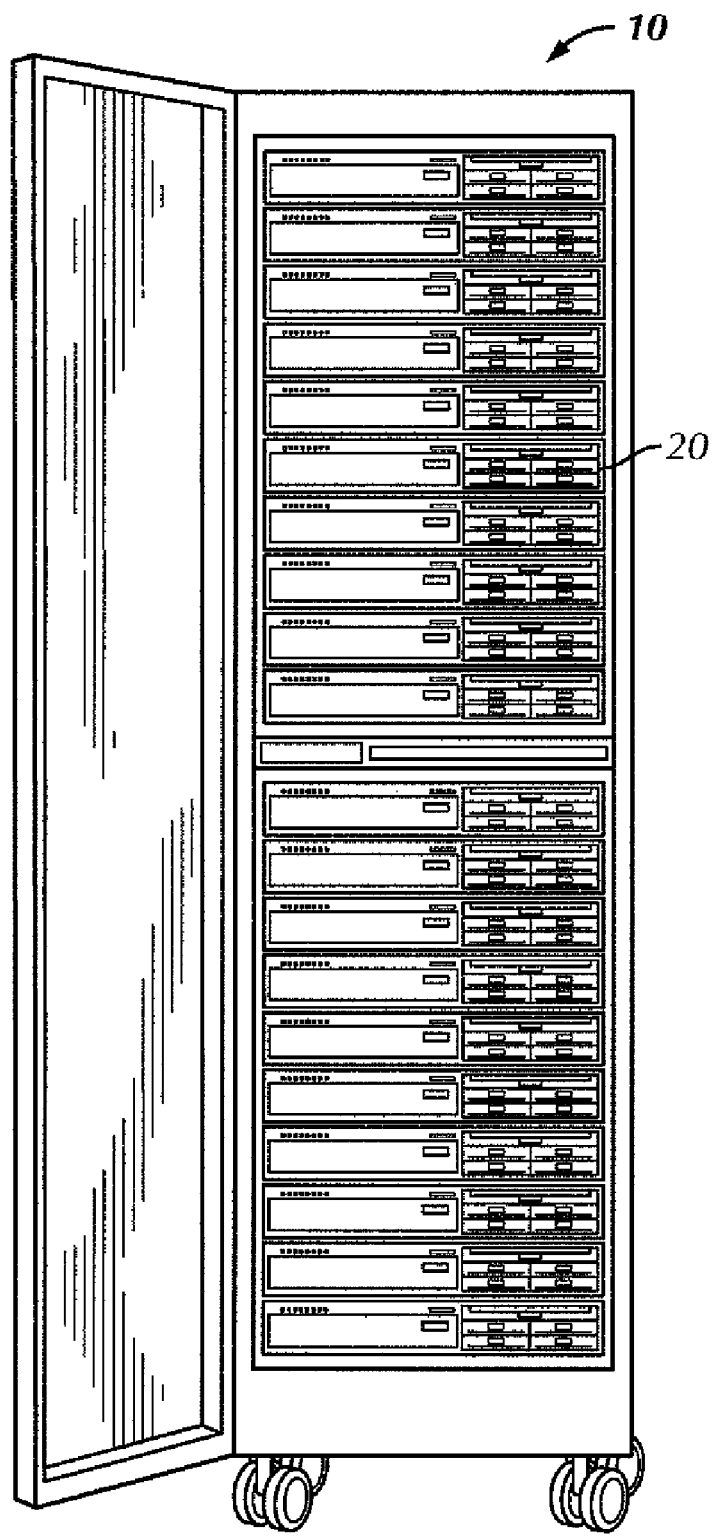
FIG. 1 shows a computer server rack with computer servers disposed therein.
Figure 2:
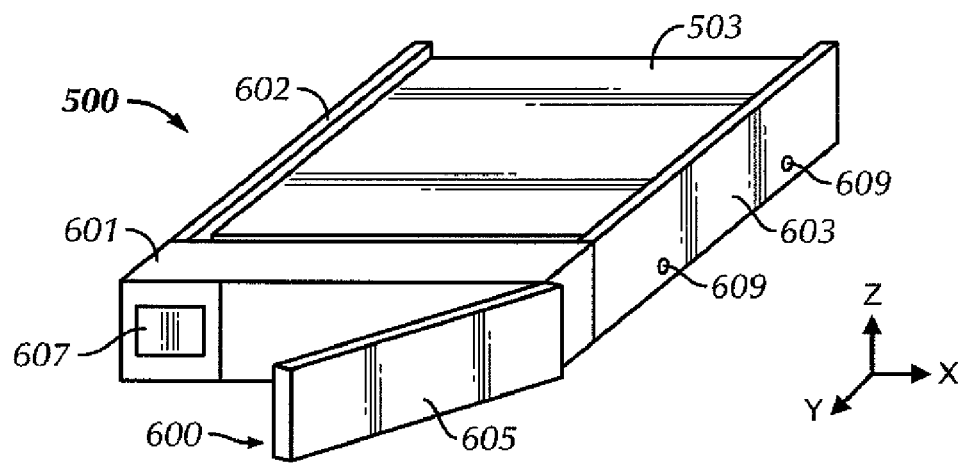
FIG. 2 shows a hard disk drive ("HDD") disposed within a HDD bracket.

One or more embodiments of the present invention relates to a hard disk drive ("HDD") throughput-enhancing vibration control device for a HDD bracket having a HDD. For ease of explanation, FIG. 2 shows x, y, and z axes for the HDD bracket 600. In the following descriptions, "forward" and "front" denote a +y direction, "rearward" and "rear" denote a −y direction, "upward" denotes a +z direction, "downward" denotes a −z direction, "right" denotes a +x direction, and "left" denotes a −x direction. Further, a "lateral" axis is the x axis.

FIG. 2 shows a HDD 500 disposed within a HDD bracket 600. The HDD 500 has a top surface 503. The HDD 500 is disposed between left and right side bracket portions 602, 603 of the HDD bracket 600, and behind a front bezel 601 of the HDD bracket 600. The HDD 500 may be attached to the HDD bracket 600, for example, by screwing screws 609 into the sides of the HDD 500. The left side bracket portion 602 is higher than the right side bracket portion 603, which initially slopes downward from the front bezel 601. A HDD bracket lever 605 is disposed at a front portion of the front bezel 601, and is rotatably fixed about a corner of the front bezel 601.

FIG. 2 shows the HDD bracket lever 605 of the HDD bracket 600 in the open position. The HDD bracket 600 can be inserted into a drive cage within a blade server when the HDD bracket lever 605 is in the open position. After insertion, the HDD bracket lever 605 is pushed into the closed position, which secures the HDD bracket 600 within the drive cage. A release button 607 disposed on the front of the front bezel 601, when pressed while the HDD bracket lever 605 is secured within the drive cage in the closed position, releases the HDD bracket lever 605 into the open position, and the HDD bracket 600 can be easily removed from the drive cage.

Figure 3:
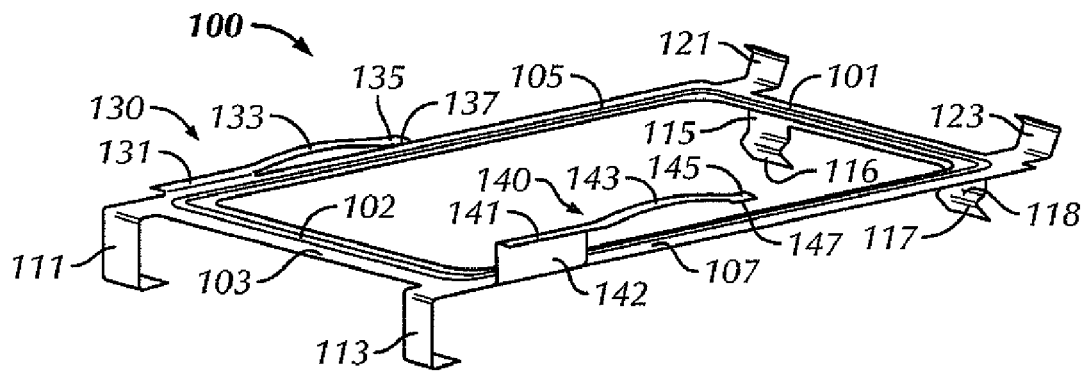
FIG. 3 shows a top perspective view of a HDD throughput-enhancing vibration control device according to one or more embodiments of the present invention.
Figure 4:
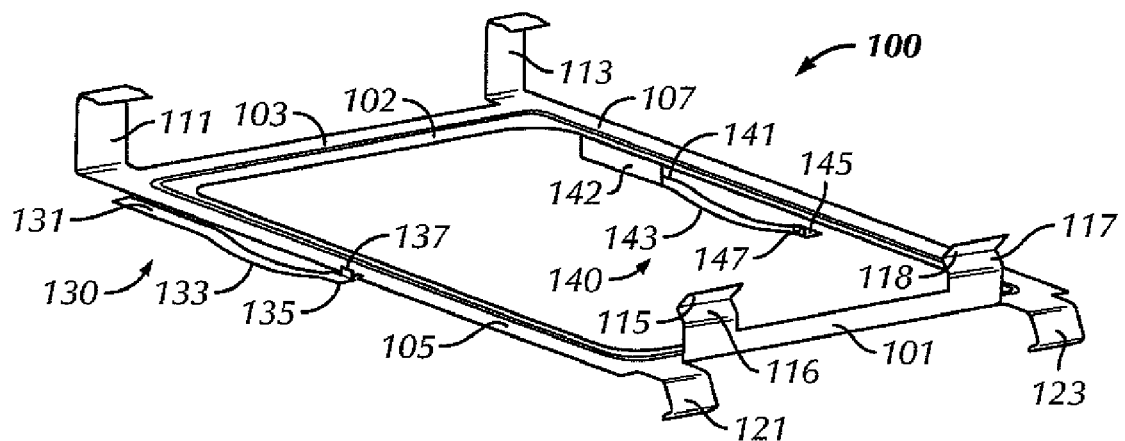
FIG. 4 shows a bottom perspective view of a HDD throughput-enhancing vibration control device according to one or more embodiments of the present invention.

FIG. 3 shows a top perspective view, and FIG. 4 shows a bottom perspective view, of the HDD throughput-enhancing vibration control device 100 according to one or more embodiments of the present invention. The HDD throughput-enhancing vibration control device 100 is of a singular metallic or plastic construction, and has a rectangular main body 110 made up of a front bar 101, a rear bar 103, a right bar 105, and a left bar 107. In one or more embodiments of the present invention, the HDD throughput-enhancing vibration control device 100 is formed of a single stainless steel piece. A raised portion 102 extends along a middle perimeter of the main body 110.

Rear clips 111, 113 extend from a rear side of the rear bar 103, at lateral ends thereof. Each of the rear clips 111, 113 extends rearward, downward, then forward, as shown in FIG. 3. The rear clip 111 on the right lateral end is wider than the rear clip 113 on the left lateral end.

Front clips 115, 117 and rail clips 121, 123 extend from the front side of the front bar 101. The rail clips 121, 123 are disposed near the lateral ends of the front bar. Each of the rail clips 121, 123 extends forward, then extends at an angle forward and upward, then extends at an angle rearward and upward. The front clips 115, 117 are disposed immediately adjacent to the rail clips 121, 123, on laterally inner sides thereof. That is, the right front clip 115 is disposed adjacent left to the right rail clip 121, and the left front clip 117 is disposed adjacent right to the left rail clip 123. Each of the front clips 115, 117 initially extends downward, at an angle rearward and downward, then at an angle forward and downward. The intersections of the two angled portions the front clips 115, 117 create inward edges 116, 118

A right rail spring 130 extends from near the rear of the right bar 105, on a right side thereof. The right rail spring 130 extends slightly upwards, then towards the right, forming a slightly raised flat portion 131. An upward arching spring portion 133 extends forward from the flat portion 131. A flat end portion 135 extends forward from the front end of the spring portion 133. An inner positioning tab 137 extends perpendicularly from the end portion 135, downwards from the left side of the end portion 137, that is, on the inner side of the right rail spring 130.

A left rail spring 140 extends from near the rear of the left bar 107, on a left side thereof. The left rail spring 140 extends significantly upwards, then towards the left, forming a vertical wall portion 142, and a raised flat portion 141. An upward arching spring portion 143 extends forward from the flat portion 141. A flat end portion 145 extends forward from the front end of the spring portion 143. An inner positioning tab 147 extends perpendicularly from the end portion 145, downwards from the right side of the end portion 147, that is, on the inner side of the left rail spring 140.

Figure 5:
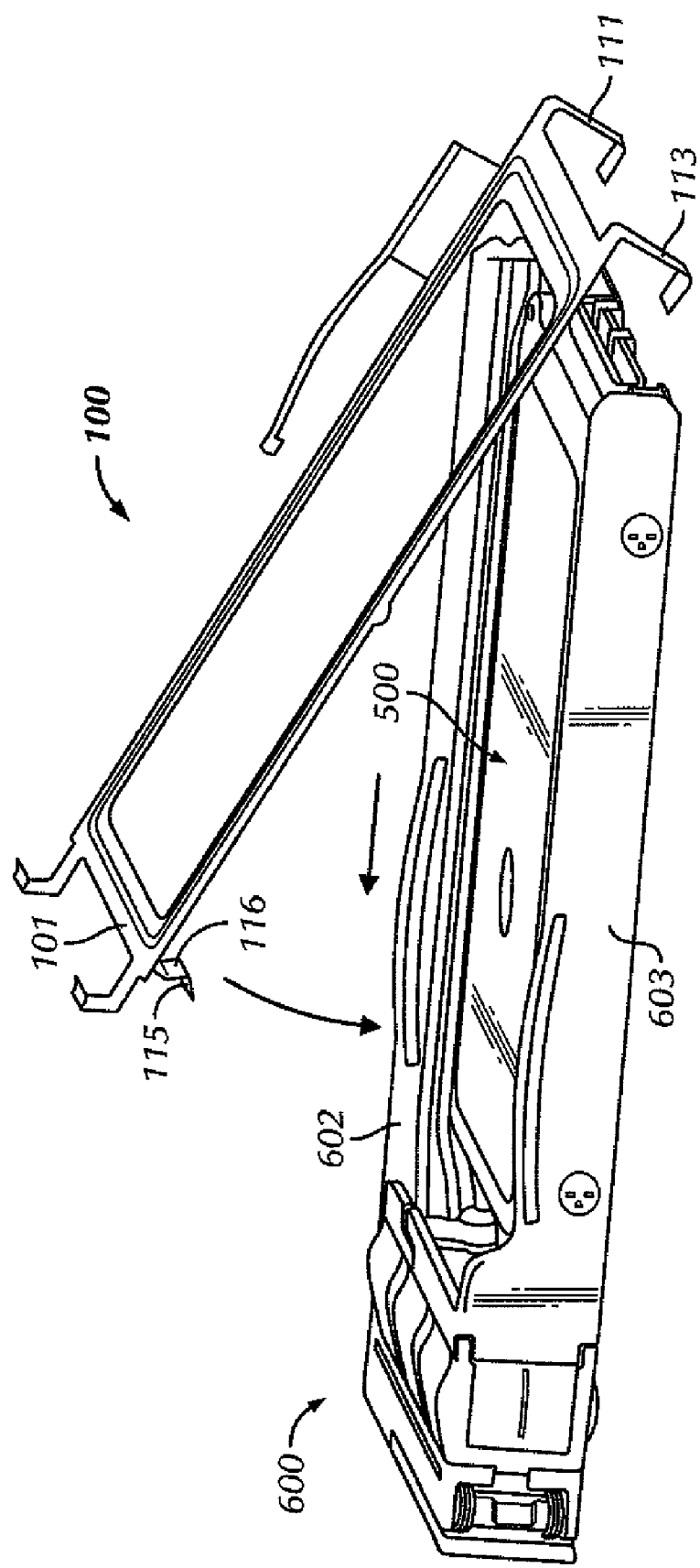
FIG. 5 shows the installation of a HDD throughput-enhancing vibration control device according to one or more embodiments of the present invention onto a HDD bracket and a HDD.

FIG. 5 shows the installation of a HDD throughput-enhancing vibration control device 100 according to one or more embodiments of the present invention onto a HDD bracket 600 and HDD 500. The HDD throughput-enhancing vibration control device 100 is placed over the HDD 500 at an angle, with the front bar 101 raised. The rear clips 111, 113 slide onto the back of the HDD 500, so that the rear clips 111, 113 latch onto the HDD 500. The front bar is then rotated down onto the HDD 500, so that the front clips 115, 117 latch onto the front of the HDD 500, by fitting the edges 116, 118 of the front clips 115, 117 into recesses formed in the front of the HDD 500. The HDD throughput-enhancing vibration control device 100 thereby snaps onto the HDD 500.

Figure 6:
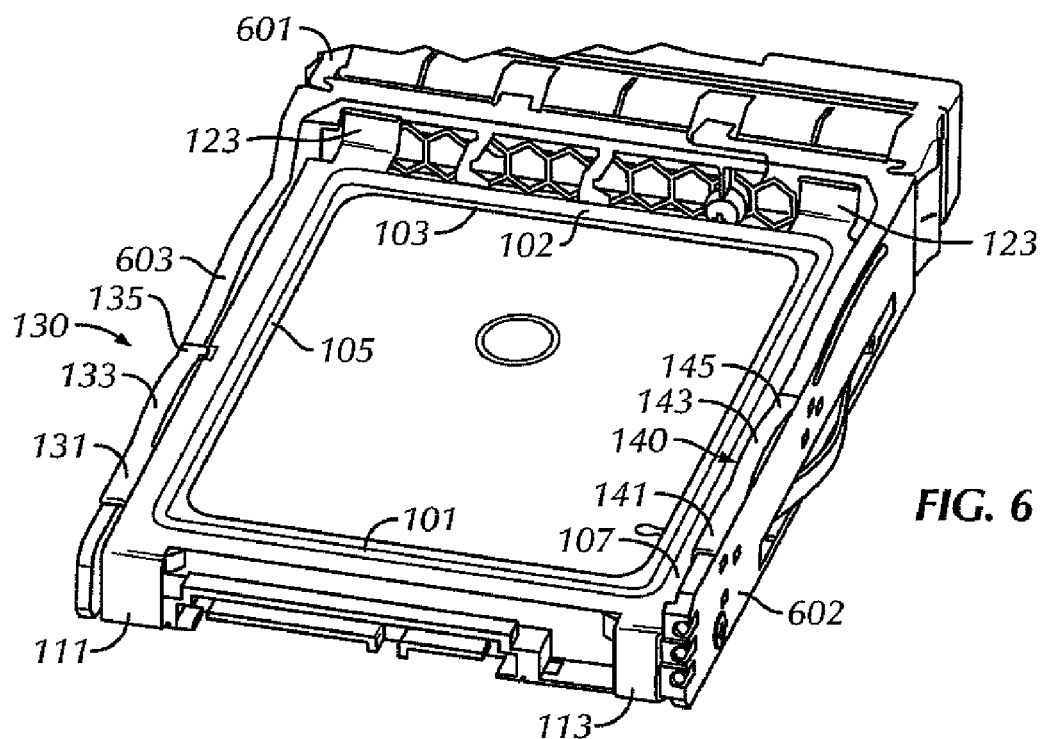
FIG. 6 shows a back perspective view of a HDD throughput-enhancing vibration control device according to one or more embodiments of the present invention that has been installed onto a HDD bracket having a HDD.

FIG. 6 shows a back perspective view of a HDD throughput-enhancing vibration control device 100 according to one or more embodiments of the present invention that has been installed onto a HDD bracket 600 having a HDD 500. The main body 110 made of the front bar 101, the rear bar 103, the right bar 105, and the left bar 107 rest on the periphery of the top surface of 503 the HDD 500, while leaving an opening therein so that any labels present on the top surface 503 of the HDD 500 remains readable. The main body 110 reinforces the HDD 500, providing extra support and stiffness to the HDD 500, which helps prevent board flexure of a printed circuit board assembly ("PCBA") for the HDD 500. The raised portion 102 of the main body 110 helps prevent flexing of the main body 110, which in turns adds stiffness to the HDD 500.

Figure 7:
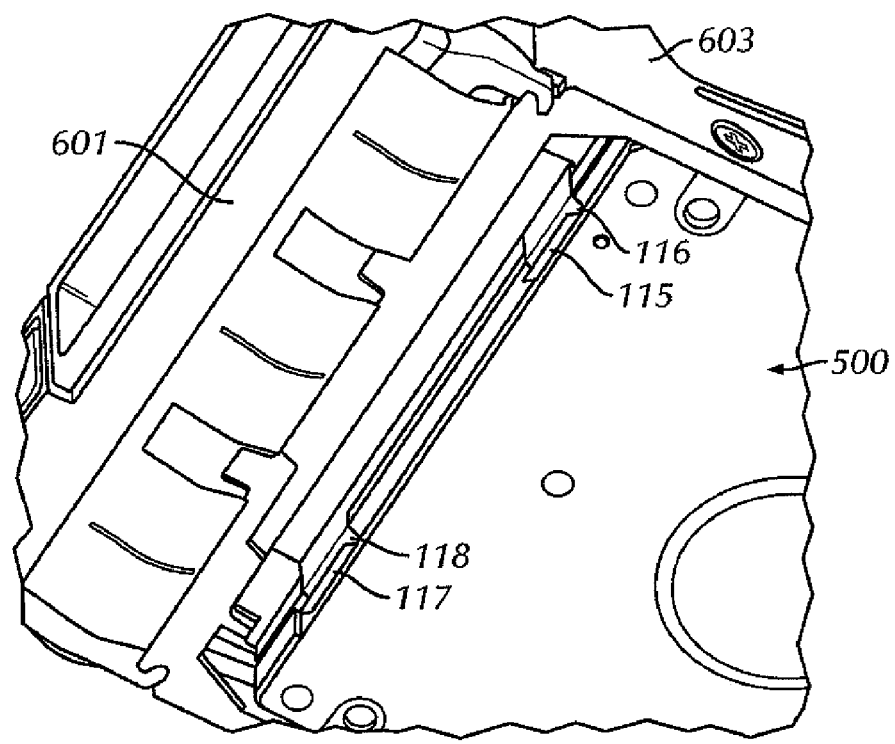
FIG. 7 shows a close-up bottom perspective view of front clips of a HDD throughput-enhancing vibration control device according to one or more embodiments of the present invention latched onto the HDD.

FIG. 7 shows a close-up bottom perspective view of front clips 115, 117 of a HDD throughput-enhancing vibration control device 100 according to one or more embodiments of the present invention latched onto the HDD 500. The front clips 115, 117 extend partially over the front of the HDD 500, and remain latched onto the front surface of the HDD 500 by the edges 116, 118 of the front clips 115, 117 that are retained in recesses formed in the front surface of the HDD 500. The front clips 115, 117 secure the front of the HDD throughput-enhancing vibration control device 100 on the HDD 500.

Figure 8:
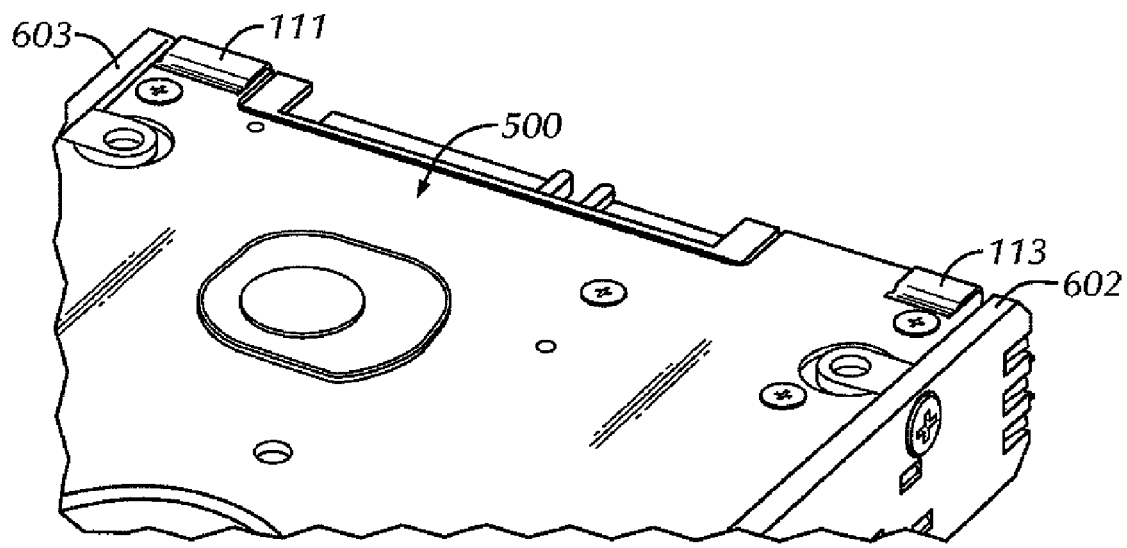
FIG. 8 shows a close-up bottom perspective view of rear clips of a HDD throughput-enhancing vibration control device according to one or more embodiments of the present invention latched onto the back of the HDD.

FIG. 8 shows a close-up bottom perspective view of rear clips 111, 113 of a HDD throughput-enhancing vibration control device 100 according to one or more embodiments of the present invention latched onto the back of the HDD 500. The rear clips 111, 113 extend over the back of the HDD, and is clamped onto the bottom of the HDD 500. The rear clips 111, 113 hold the back of the HDD throughput-enhancing vibration control device 100 down and, in conjunction with the front clips 115, 117, restrain forward and rearward movement of the HDD throughput-enhancing vibration control device 100.

Figure 9:
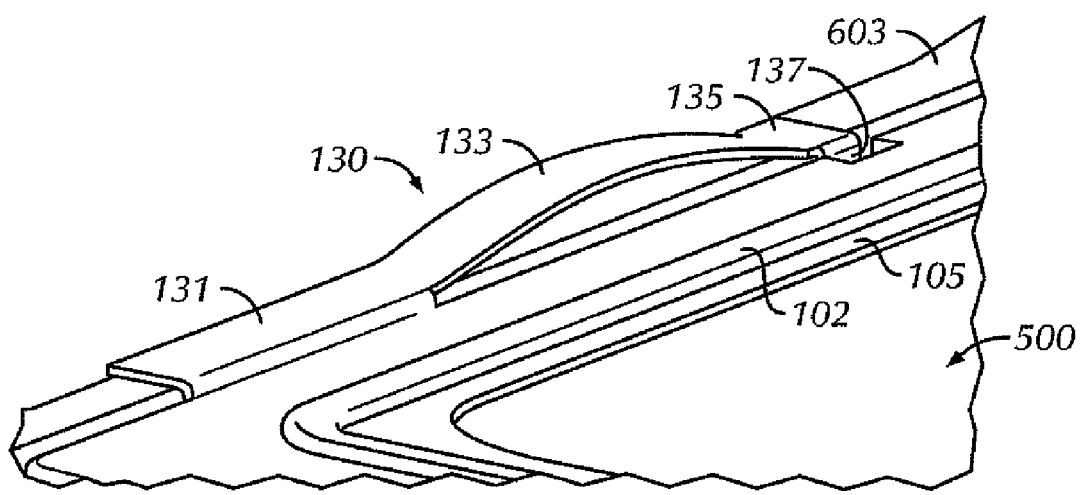
FIG. 9 shows a close-up back perspective view of right rail spring of a HDD throughput-enhancing vibration control device according to one or more embodiments of the present invention disposed on a HDD bracket having a HDD.

FIG. 9 shows a close-up back perspective view of right rail spring 130 of a HDD throughput-enhancing vibration control device 100 according to one or more embodiments of the present invention disposed on a HDD bracket 600 having a HDD 500. The flat portion 131 and end portion 135 of the right rail spring 130 rest on the top surface of the right side bracket portion 603, while the spring portion 133 is raised from the top surface in an arc.

Figure 10:
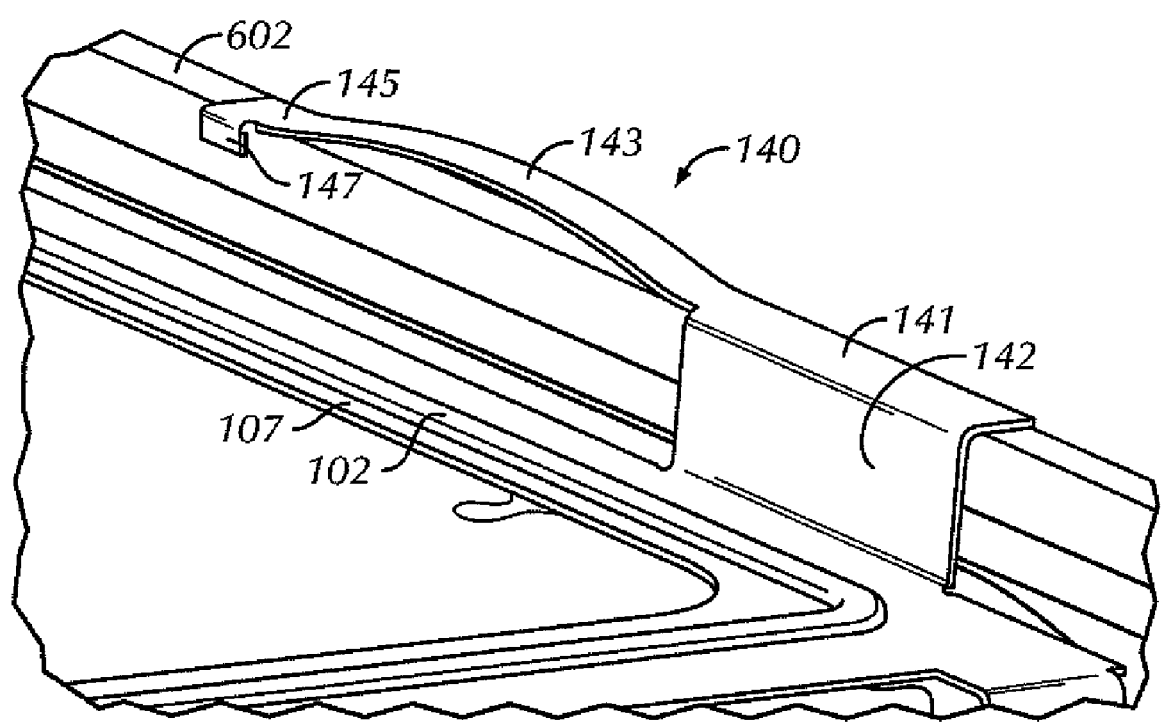
FIG. 10 shows a close-up back perspective view of left rail spring of a HDD throughput-enhancing vibration control device according to one or more embodiments of the present invention disposed on a HDD bracket having a HDD.

FIG. 10 shows a close-up back perspective view of left rail spring 140 of a HDD throughput-enhancing vibration control device 100 according to one or more embodiments of the present invention disposed on a HDD bracket 600 having a HDD 500. The flat portion 141 and end portion 145 of the left rail spring 140 rest on the top surface of the left side bracket portion 602, while the spring portion 143 is raised from the top surface in an arc. Because the left side bracket portion 602 of the HDD bracket is higher than the right side bracket portion 603, the left rail spring 140 extends higher from the left bar 107 than does the right rail spring 130 from the right bar 105. Although here, the outer surface of the vertical wall portion 142 created by the elevated left rail spring 140 does not contact the left side bracket portion 602, in one or more embodiments of the present invention, the vertical wall portion 142 may abut the left side bracket portion 602.

When the HDD bracket 600 having a HDD 500 is disposed in a drive cage of a blade server (not shown), the top of the spring portions 133, 143 of the right and left rail springs 130, 140 and the top of the rail clips 121, 123 abut the top wall of the drive cage. Thus, the rail clips 121, 123 and the spring portions 133, 143 acts as a gap filler, eliminating mechanical gaps between the HDD bracket 600 and the drive cage, which in turn suppresses vibration that would otherwise occur more freely due to the mechanical gaps. Further, when vibration applies a downward force from the top wall of the drive cage, the spring portions 133, 143 flex downwards, which dampens the vibration. As the spring portions 133, 143 flex downwards, the end portions 135, 145 are free to slide in a forward direction to compensate, while the inner tabs 137, 147 disposed on the end portions 135, 145 and in contact with the inner surfaces of the right and left side brackets 603, 602 help maintain the position of the right and left rail springs 130, 140, and prevents outward splaying of the right and left rail springs 130, 140.

A HDD throughput-enhancing vibration control device 100 according to one or more embodiments of the present invention has an advantage of HDD throughput-enhancement by suppressing vibration of the HDD 500.

A HDD throughput-enhancing vibration control device 100 according to one or more embodiments of the present invention has an advantage of providing support and rigidness to the often fragile PCBA of small form factor HDDs.

A HDD throughput-enhancing vibration control device 100 according to one or more embodiments of the present invention has an advantage of suppressing stresses on connector interfaces of the HDDs by suppressing vertical displacement of the HDDs.

A HDD throughput-enhancing vibration control device 100 according to one or more embodiments of the present invention has an advantage of being able to implement throughput-enhancement without requiring system-level or bracket modifications.

A HDD throughput-enhancing vibration control device 100 according to one or more embodiments of the present invention has an advantage of low cost implementation and simple fool-proof design.

A HDD throughput-enhancing vibration control device 100 according to one or more embodiments of the present invention has an advantage of backwards compatibility with existing HDD and HDD brackets, as well as existing drive modules and drive mounting schemes.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A hard disk drive (HDD) vibration control device disposed on a HDD bracket comprising a HDD, the HDD vibration control device comprising:

a main body portion comprising a front bar, a rear bar, a left bar, and a right bar;

a rear clip extending down from the rear bar clamped onto the HDD;

a front clip extending down from the front bar clamped onto the HDD;

a left rail spring comprising a first flat portion extending outwards from the left bar and comprising a first spring portion extending from the first flat portion; and a right rail spring comprising a second flat portion extending outwards from the right bar and comprising a second spring portion extending from the second flat portion, wherein the first and second flat portions of the left rail spring and the right rail spring rest, respectively, on top surfaces of a left side bracket and a right side bracket of the HDD bracket; and wherein the first and second spring portions of the left rail spring and the right rail spring are above the top surfaces of the left side bracket and the right side bracket, and are configured to flex downwards when a force is applied from above.

2. The HDD vibration control device according to claim 1, wherein the front clip extends down a partial length of a front surface of the HDD and is clamped onto a recess on the front surface of the HDD.

3. The HDD vibration control device according to claim 1, wherein the rear clip extends down an entire length of a rear surface of the HDD and clamped onto a bottom surface of the HDD.

4. The HDD vibration control device according to claim 1, wherein the left rail spring further comprises a first flat end portion extending from the first spring portion that rests on the top surface of the left side bracket, and the right rail spring further comprises a second flat end portion extending from the second spring portion that rests on the top surface of the right side bracket.

5. The HDD vibration control device according to claim 4, wherein the left rail spring further comprises a first inner positioning tab extending perpendicularly down from the first end portion on an inner side of the left side bracket, and the right rail spring further comprises a second inner positioning tab extending perpendicularly down from the second end portion on an inner side of the right side bracket.

6. The HDD vibration control device according to claim 1, wherein a raised portion extends along a middle perimeter of the main body.

7. The HDD vibration control device according to claim 1, further comprising a rail clip extending up from the front bar and configured to flex downwards when a force is applied from above.

8. A blade server comprising a drive cage, a hard disk drive (HDD) bracket comprising a HDD disposed in the drive cage, and a HDD vibration control device disposed on the HDD, the HDD vibration control device comprising:
a main body portion comprising a front bar, a rear bar, a left bar, and a right bar;
a rear clip extending down from the rear bar clamped onto the HDD;
a front clip extending down from the front bar clamped onto the HDD;
a left rail spring comprising a first flat portion extending outwards from the left bar and comprising a first spring portion extending from the first flat portion; and
a right rail spring comprising a second flat portion extending outwards from the right bar and comprising a second spring portion extending from the second flat portion,
wherein the first and second flat portions of the left rail spring and the right rail spring rest, respectively, on top surfaces of a left side bracket and a right side bracket of the HDD bracket;
wherein tops of the first and second spring portions abut a top wall of the drive cage; and
wherein the first and second spring portions of the left rail spring and the right rail spring are above the top surfaces of the left side bracket and the right side bracket, and are configured to flex downwards when the top wall of the drive cage exerts a downward force thereon.

9. The blade server according to claim 8, wherein the front clip extends down a partial length of a front surface of the HDD and is clamped onto a recess on the front surface of the HDD.

10. The blade server according to claim 8, wherein the rear clip extends down an entire length of a rear surface of the HDD and clamped onto a bottom surface of the HDD.

11. The blade server according to claim 8, wherein the left rail spring further comprises a first flat end portion extending from the first spring portion that rests on the top surface of the left side bracket, and the right rail spring further comprises a second flat end portion extending from the second spring portion that rests on the top surface of the right side bracket.

12. The blade server according to claim 11, wherein the left rail spring further comprises a first inner positioning tab extending perpendicularly down from the first end portion on an inner side of the left side bracket, and the right rail spring further comprises a second inner positioning tab extending perpendicularly down from the second end portion on an inner side of the right side bracket.

13. The blade server according to claim 8, wherein a raised portion extends along a middle perimeter of the main body.

14. The blade server according to claim 8, further comprising a rail clip extending up from the front bar, a top of which abuts the top wall of the drive cage, the rail clip being configured to flex downwards when a downward force is exerted by the top wall of the drive cage.

15. A hard disk drive (HDD) vibration control device configured to be disposed on a HDD bracket comprising a HDD, the HDD vibration control device comprising:
a main body portion comprising a front bar, a rear bar, a left bar, and a right bar;
a rear clip extending down from the rear bar and configured to clamp onto the HDD;
a front clip extending down from the front bar and configured to clamp onto the HDD;
a left rail spring extending outwards from the left bar and comprising a flat portion and a first spring portion; and
a right rail spring extending outwards from the right bar and comprising a flat portion and a second spring portion,
wherein the first and second flat portions of the left rail spring the right rail spring are configured to rest on top surfaces of left and right side brackets of the HDD bracket; and
wherein the first and second spring portions of the left rail spring the right rail spring are configured to rest on top surfaces of the left and right side brackets and to flex downwards when a force is applied from above.

16. The HDD vibration control device according to claim 15, wherein the left rail spring further comprises a first flat end portion extending from the first spring portion configured to rest on the top surface of the left side bracket, and the right rail spring further comprises a second flat end portion extending from the second spring portion that is configured to rest on the top surface of the right side bracket.

17. The HDD vibration control device according to claim 16, wherein the left rail spring further comprises a first inner positioning tab extending perpendicularly down from the first end portion on an inner side of the HDD vibration control device, and the right rail spring further comprises a second inner positioning tab extending perpendicularly down from the second end portion on an inner side of the HDD vibration control device.

18. The HDD vibration control device according to claim 15, wherein a raised portion extends along a middle perimeter of the main body.

19. The HDD vibration control device according to claim 15, further comprising a rail clip extending up from the front bar and configured to flex downwards when a force is applied from above.

* * * * *